(12) United States Patent
Mansour et al.

(10) Patent No.: US 10,087,113 B2
(45) Date of Patent: Oct. 2, 2018

(54) COMPOSITION FOR FERTILIZING AGRICULTURAL LAND, A METHOD FOR PRODUCING THE COMPOSITION AND THE USE OF SAID COMPOSITION

(71) Applicant: Rawya Lotfy Mansour, Princesse Charlotte (MC)

(72) Inventors: Rawya Lotfy Mansour, Princesse Charlotte (MC); Awad Fikry, Le Caire (EG)

(73) Assignee: RAWYA LOTFY MANSOUR, Princesse Charlotte (MC)

( * ) Notice: Subject to any disclaimer, the term of this patent is extended or adjusted under 35 U.S.C. 154(b) by 2 days.

(21) Appl. No.: 15/032,553

(22) PCT Filed: Oct. 28, 2014

(86) PCT No.: PCT/EP2014/073075
§ 371 (c)(1),
(2) Date: Apr. 27, 2016

(87) PCT Pub. No.: WO2015/063059
PCT Pub. Date: May 7, 2015

(65) Prior Publication Data
US 2016/0264483 A1    Sep. 15, 2016

(30) Foreign Application Priority Data

Oct. 28, 2013 (FR) ..................... 13 60495

(51) Int. Cl.
| | | |
|---|---|---|
| C05D 9/02 | (2006.01) | |
| C05D 9/00 | (2006.01) | |
| C05F 11/08 | (2006.01) | |
| C05D 5/00 | (2006.01) | |
| C05B 1/02 | (2006.01) | |
| C05C 1/00 | (2006.01) | |
| C05D 1/00 | (2006.01) | |
| C05F 3/00 | (2006.01) | |
| C05F 11/00 | (2006.01) | |
| C05F 17/00 | (2006.01) | |
| A01C 21/00 | (2006.01) | |

(52) U.S. Cl.
CPC ............. *C05F 3/00* (2013.01); *A01C 21/00* (2013.01); *C05B 1/02* (2013.01); *C05C 1/00* (2013.01); *C05D 9/00* (2013.01); *C05F 11/00* (2013.01); *C05F 17/00* (2013.01); *C05D 1/00* (2013.01); *C05D 5/00* (2013.01); *C05F 11/08* (2013.01); *Y02A 40/205* (2018.01); *Y02P 20/145* (2015.11); *Y02W 30/43* (2015.05)

(58) Field of Classification Search
None
See application file for complete search history.

(56) References Cited

U.S. PATENT DOCUMENTS

| | | | | |
|---|---|---|---|---|
| 4,264,448 | A * | 4/1981 | Bodenrader | C05F 3/00 210/611 |
| 4,774,186 | A * | 9/1988 | Schaefer, Jr. | C05F 11/08 435/257.1 |
| 5,534,437 | A * | 7/1996 | Arrau | C05F 17/0027 422/209 |
| 6,254,654 | B1 * | 7/2001 | Van Barneveld | C05F 9/04 405/264 |
| 8,347,551 | B2 * | 1/2013 | Van Der Drift | A01N 51/00 47/57.6 |
| 8,932,382 | B2 * | 1/2015 | Tariq | C05B 15/00 71/6 |
| 2010/0199734 | A1 * | 8/2010 | Bottcher | C05D 9/00 71/8 |
| 2013/0055635 | A1 * | 3/2013 | Harman | A01G 31/001 47/58.1 R |
| 2013/0199255 | A1 * | 8/2013 | Schulmann | C05D 9/00 71/9 |
| 2013/0291607 | A1 * | 11/2013 | Mansour | C05D 9/00 71/6 |
| 2014/0323297 | A1 * | 10/2014 | Harman | C05F 1/005 504/101 |

* cited by examiner

*Primary Examiner* — Wayne Langel
(74) *Attorney, Agent, or Firm* — Hauptman Ham, LLP

(57) ABSTRACT

The present invention relates to a composition for fertilizing desert land and making it agricultural, characterized in that it comprises animal excrement, plant waste, bentonite in an amount greater than 10%, essential macronutrients, essential micronutrients, agricultural sulphur, algae and effective microorganisms. The invention will be of use in agriculture, in particular for increasing the yields of soils that are not very fertile, such as deserts which form most of the countries of North Africa and the Middle East. Deserts are among the only lands which are not polluted because of overgrazing and the exhaustive use of chemical fertilizers. It is therefore essential to respect these lands and to limit the pollution thereof. The composition according to the invention comprises animal and plant waste. The recycling of this agricultural waste contributes to improving atmospheric and soil pollution by limiting the burning of waste that is harmful to the environment and to human health. The composition also makes it possible to combat global warming, in particular by recycling the waste and saving water, 80% of the use of which is for agriculture in developing countries. By creating new agricultural lands, it will be possible to create jobs and the food sufficiency of this country will be improved. The use of the present composition falls within an approach of sustainable development and green technology.

20 Claims, No Drawings

COMPOSITION FOR FERTILIZING AGRICULTURAL LAND, A METHOD FOR PRODUCING THE COMPOSITION AND THE USE OF SAID COMPOSITION

The present invention relates to a composition for fertilising agricultural land, a method for producing the composition and the use of said composition.

The invention will find its application in agriculture and in particular for increasing the yields of soils that are not very fertile.

The countries where a majority of the land consists of deserts face problems in feeding their populations because of the lack of water for cultivating and the predominance of deserts limiting cultivatable land. New agricultural lands are being won on the poor and sandy soils in the deserts that form the majority of the countries of North Africa and the Middle East. For example, in Egypt, lands on either side of the Nile valley are being transformed into cultivatable lands, in particular in the Nile delta, but the quantities of organic materials are particularly small, below 0.1%, and the yields are mediocre.

These lands must be enriched by various fertilisers, but the sandy nature of the soils prevents retention thereof. They are carried away by the irrigation water, preventing good yields and causing ecological damage by polluting the groundwater. Deserts are among the only lands that are not polluted because of overgrazing and the extensive use of chemical fertilisers. It is therefore essential to respect these lands and limit pollution thereof.

The applicant has tested the subject matter of its patent application WO 2012/097827 by proposing a solution for increasing the production of land by means of a fertilising composition.

However, the applicant perceived that this composition was particularly expensive for farmers, in particular in developing countries in the south living below the poverty threshold, in particular in the south of Egypt. This composition also appeared difficult to use without special equipment. The increase in the price of fossil energy, and because of this of the chemical fertilisers made from oil, creates instabilities in these countries, which do not manage to become self-sufficient with regard to the need to feed their inhabitants.

The present invention proposes a composition for fertilising agricultural land that can be produced at less cost and gives very satisfactory results.

To this end, the composition of the invention uses mainly recycled and inexpensive components. In particular, the invention comprises waste issuing from animals but also plants as the main source of the macronutrients and micronutrients necessary in agricultural. The composition according to the invention does not harm the environment and in particular does not degrade the soils and the environment (eco-friendly).

The composition highly advantageously includes bentonite, colloidal clay having a very high water-retention capacity. Bentonite has a very strong cation exchange capacity in comparison with other clays. Bentonite is a product that is abundant in Egypt and very accessible financially. Bentonite is a natural product present in deserts. However, it is not known in the agricultural field.

Advantageously, the invention comprises essential micronutrients and macronutrients that are preferentially added in the form of ores.

Advantageously, algae are introduced into the composition. Algae are advantageously an important source of nitrogen.

Preferentially, efficient microorganisms (EMs) are included in the composition so as to facilitate decomposition of the organic material.

The composition can therefore be easily formulated with abundant constituents.

The composition according to the invention comprises animal and plant waste. Recycling this agricultural waste helps to improve atmospheric and soil pollution by limiting the burning of waste that is harmful for the environment and human health. Use of the present composition forms part of a sustainable development and green technology procedure.

Furthermore, the composition according to the invention exhibits rapid and easy fermentation without requiring dedicated equipment. Surprisingly, this accelerated fermentation, compared with the compositions of the prior art, may be due to the large quantity of bentonite in the composition, at least 10%, preferentially 12% to 15%. This higher proportion is particular innovative since the presence of clay in a large quantity is not a conventional procedure in fertilisers. Synergy between the bentonite and the microorganisms present in the composition may explain these good fermentation results.

It should be stated that the invention concerns a composition for fertilising agricultural land, characterised by the fact that it comprises: animal excrement, plant waste, bentonite in a quantity greater than 10% by weight of the final composition, essential macronutrients, essential micronutrients, agricultural sulphur, algae and efficient microorganisms.

According to preferred but non-limitative variants, the invention is such that:
- bentonite represents 10% to 25% of the weight of the final composition, preferentially 12% to 15%;
- the animal excrement is chicken excrement;
- the plant waste comprises compost and/or non-fermented plant waste, for example rice straw or chopped agricultural waste;
- the carbon: nitrogen ratio is 14:1 after 21 days of fermentation;
- the micronutrients are chosen from ferrous sulphate, zinc, manganese and copper sulphate;
- the macronutrients are chosen from superphosphate, ammonium nitrate, potassium sulphate and magnesium sulphate;
- the cation exchange capacity (CEC) of the composition increases by 80% to 120% after 42 days of fermentation;
- the cation exchange capacity (CEC) increases by 100% after 42 days of fermentation;
- the animal excrement represents 10% to 25% by weight of the final composition, preferentially 10%;
- the plant waste represents from 40% to 60%, preferentially 47% by weight of the final composition;
- the compost represents 10% to 20%, preferentially 12% by weight of the final composition;
- the non-fermented plant waste represents 30% to 40%, preferentially 35%, of the weight of the final composition;
- the algae are added in a quantity of 2 to 3 liters per tonne of final composition;
- the efficient microorganisms are added in a quantity of 2 to 3 liters per tonne of final composition;
- the composition comprises, for one tonne of final composition:

| | |
|---|---|
| animal excrement | 100 kg |
| plant waste | 350 kg |
| compost | 120 kg |
| bentonite | 120 kg |
| superphosphate | 40 kg |
| ammonium nitrate | 60 kg |
| feldspar | 30 kg |
| zinc | 5 kg |
| manganese | 5 kg |
| copper sulphate | 3 kg |
| agricultural sulphur | 30 kg |
| algae | 2.5 liters |
| advantageously, compost starter | 2.5 liters |
| efficient microorganisms (EMs) | 2.5 liters |
| water | QSP 1000 kg |

Another subject matter of the invention relates to a method for manufacturing the composition in order to mechanically and microbiologically transform the constituents into an efficient composition for fertilising soils. The present method helps to surprisingly accelerate the fermentation times.

The invention relates to a method for manufacturing the composition for fertilising agricultural land, characterised by the fact that it comprises the following steps:
  chopping the animal excrement and plant waste into small pieces, preferentially of a size of 1 to 2 cm, which promotes rapid fermentation;
  forming, in a light-tight and airtight container, successive layers of animal excrement and plant waste, and the bentonite mixed with the essential macronutrients and micronutrients;
  moistening each layer with water mixed with the algae and efficient microorganisms so as to obtain a moisture level of 20% to 25%;
  mixing twice a week, for at least three weeks, for the fermentation, checking the moisture level and temperature and spraying water as necessary to maintain a moisture level of 20% to 25% and a temperature of 40° to 55°.

Advantageously, half the quantity of efficient microorganisms is mixed with water in order to moisten each layer and the other half of the quantity of efficient microorganisms is mixed with the water for irrigating the land fertilised during the first spraying.

Another aspect of the invention relates to the use of a composition for fertilising agricultural land by mixing 5 to 7 tonnes of the composition per feddan of land according to the type of soil and cultivation.

Advantageously, the earth is turned over to a depth of 30 cm.

According to another aspect, the invention relates to a method for fertilising agricultural land, characterised in that it comprises the following steps:
  dispersing 5 to 7 tonnes of composition as described previously over 1 feddan of land;
  turning over the earth;
  irrigating the fertilised earth with water and 1 to 1.5 liters of efficient microorganisms.

Other aims and advantages will emerge during the following description of a preferred embodiment.

According to the invention, the waste issuing from animals is preferentially animal excrement. Preferentially, the animal excrement is chicken, horse or cow dung, which is very rich in organic material and macronutrients such as nitrogen. Other types of dung may be used, for example horse dung. The quantity thereof is advantageously between 100 and 250 kg, preferentially 100 kg per tonne of composition.

The plant waste comprises fermented waste such as compost and/or non-fermented waste. Preferentially, the two are mixed so as to provide microorganisms specific to the decomposition of plants. The non-fermented plants are for example rice straw, maize plants, palm branches or sugar cane or other agricultural waste. Preferentially, the composition comprises 300 to 400 kg of plant waste per tonne of composition, or more precisely 350 kg. According to a preferred embodiment, the composition also comprises compost, for example in a quantity of between 150 and 200 kg, preferentially 120 kg. Recycling the plant waste limits the pollution of groundwater and air.

Advantageously, bentonite is added to the composition in relatively high quantities of around 100 to 250 kg, preferentially 120 kg per tonne of composition. The high percentage of bentonite, greater than 10%, preferentially greater than or equal to 12%, makes it possible to obtain a composition in which the macronutrients and water are retained by the bentonite and are therefore available for the plants. Bentonite also appears to constitute a structure essential to the development of microorganisms and thus to accelerate the fermentation of the composition.

The algae contained in the composition according to the invention are algae preferentially rich in nitrogen. Rich in nitrogen means that their nitrogen content is greater than 1.5% of the dry weight, for example 1.8% for the cyanobacteria or more than 2% for the brown algae Phaeophyceae.

These algae are preferentially a mixture of extracts of cyanobacteria culture such as: *Nostoc* sp.; *Anabeana* sp. These cyanobacteria secrete elements useful for the enrichment of the soils and the growth of plants. The mixture of algae may also comprise Phaeophyceae or brown algae. The composition according to invention is thus particularly rich in nitrogen, a macronutrient essential for the growth of plants. The algae are added to the composition in the quantity of 2 to 3 liters, preferentially 2.5 liters per tonne of composition. The density of the algae solution is preferentially around 1.5 g/cm$^3$.

The composition comprises efficient microorganisms (EMs). These efficient microorganisms may comprise up to 80 different kinds distributed essentially in in five families; lactic acid bacteria, yeasts, actinomycetes, photosynthetic bacteria and fermenting moulds. The microorganisms increase the availability of the essential micronutrients and macronutrients, According to the invention, the quantity of efficient microorganisms in the composition is between 2 and 3 liters, preferentially 2.5 liters per tonne of composition. Advantageously, the microorganisms EMs are added in two steps: 50% of the total quantity is added to the composition according to the manufacturing method described below, while the rest of the quantity of microorganisms, that is to say 50%, is mixed with the irrigation water used during the first spraying of the fertilised land, affording better availability of the micronutrients and macronutrients. Preferentially, 1 liter of microorganisms is mixed with 50 liters of water. In addition, adding the efficient microorganisms directly at the roots limits the development of diseases at the roots.

The applicant perceived that, for the initial fermentation, a smaller quantity of microorganisms was sufficient and that a further addition of microorganisms EMs during the first irrigation made it possible to restart the process of transformation of the organic material directly in situ in the fertilised land.

According to an advantageous embodiment, the composition comprises a compost starter. This starter is a mixture of actinomycetes, bacteria and fungi, for example *Trichoderma harzianum*, facilitating the decomposition of cellulose and the process of accelerated fermentation.

Agricultural sulphur is sulphur in micronised form that is easily assimilatable in agriculture. Sulphur essential for the growth of plants and also fulfils a role of fungicide. The sulphur is added to the composition to the extent of 20 to 40 kg, preferentially 30 kg per tonne of composition.

The composition is preferentially rich in macronutrients such as nitrogen, phosphorus, potassium and magnesium.

The macronutrients added to the composition preferentially issue from superphosphate and feldspar. One advantageous example is 40 kg of superphosphate and 30 kg of feldspar. The macronutrients are for example phosphate, ammonium nitrate, potassium sulphate and magnesium sulphate. Advantageously, their respective quantities for one tonne of composition are 25 to 35 kg, preferentially 30 kg of superphosphates; 50 to 70 kg, preferentially 60 kg of ammonium nitrate; 25 to 35 kg, preferentially 30 kg of potassium sulphate; 8 to 12 kg, preferentially 10 kg of magnesium sulphate.

The composition is preferentially rich in micronutrients such as iron, zinc, manganese and copper.

The micronutrients added to the composition are preferentially ferrous sulphate, zinc, manganese and copper sulphate, advantageously in respective quantities of 10, 5, 5 and 3 kg for one tonne of composition.

Water is added to the composition so as to moisten the whole. The quantity of water added is defined so as to reach 1000 kg. For example, the percentage of moisture is 20% to 25%, preferentially 23%.

To manufacture the composition according to the invention, a manufacturing method that is also the subject matter of the invention is used. The method according to the invention requires no dedicated tool. It can thus be easily established in conventional agricultural operations.

The manufacturing method advantageously allows fermentation of the composition to promote the availability of the nutrients. Thus, when the composition is used on a land, it is rapidly effective. The method according to the invention surprisingly affords rapid fermentation, unlike the methods already known. This is because, with the present method, the duration of fermentation is at least twenty one days, unlike the prior methods with at least one hundred and twenty days of fermentation.

According to the method, the animal excrement and the plant waste are ground in order to be in the form of small pieces, preferentially with a size of 1 to 2 cm. These elements are placed in a light-tight and airtight container, for example a black plastic container or more simply a plastic tarpaulin. The animal excrement and plant waste are advantageously placed in a layer, in alternation with a layer of bentonite mixed with the essential macronutrients and micronutrients. Preferentially, each layer measures from 5 to 20 cm, or more precisely from 15 to 20 cm. Preferentially, the whole measures from 1 m to 1.5 m in height.

Each layer is advantageously moistened with water, algae and efficient microorganisms. The moisture of the composition is preferentially from 20% to 25%.

For at least three weeks, the composition is mixed twice a week, and the temperature and moistness are checked in order to be maintained at a temperature of 40° to 55° and a moisture level of 20% to 25%. This step may last for up to six weeks.

The method according to the invention causes the fermentation of the composition and transformation, in non-ionic form, of the macronutrients, facilitating use thereof by plants.

The bentonite fulfils an important role by capturing the macroorganisms for example nitrogen, in the form of ammonium $NH_4$ or nitrite $NO_3$, transforms into an absorbable form captured by the bentonite.

The carbon/nitrogen ratio makes it possible to monitor the correct progress of the fermentation. Thus the composition according to the invention has a high C:N ratio, for example around 31:1, at the start of the manufacturing method. This ratio drops to 14:1 and stabilises at this level when the fermentation has ended.

According to the invention, after 21 days, the C:N ratio drops and stabilises. At 42 days, the ratio is still stable.

The method according to the invention also makes it possible to obtain a particularly effective composition with a cation exchange capacity (CEC) of between 95 meq/100 g of sample.

The macronutrients and micronutrients are thus able to be used by the plants and are therefore not entrained by the irrigation waters that might pollute the environment.

Furthermore, selecting bentonite reduces the water requirements of the fertilised land. The water is captured by the bentonite and remains available to the plants without requiring repeated watering.

The composition according to the invention is used directly on the land to be fertilised. Preferentially, 5 to 7 tonnes of composition are necessary for fertilising one feddan of land according the type of land and plantation. The composition is spread over the land and then advantageously the earth is turned over to a depth of 30 cm. Preferentially, the remaining quantity of efficient microorganisms (EMs) is mixed with water for the first irrigation of the fertilised land.

The composition according to the invention has been used confidentially in a field belonging to the applicant.

The courgette yields increased by 44% compared with the yields with an organic fertiliser of the prior art. The yields increased by around 60% for the cultivation of onions, 95% for the culture of gumbo and 63% for marrow.

In addition, the quantities of fertilising composition are half as much as with a conventional fertiliser.

The composition according to the invention also made it possible to reduce by 27% to 33% the volume of water necessary for achieving these yields. The saving in water is as much as 60% with the installation of a drip feed.

The composition of the invention was analysed before the manufacturing method and the start of the fermentation at T=0:

| | |
|---|---|
| Colour | Brown-yellow |
| Odour | Unpleasant odour |
| Density (kg/m$^3$) | 814 |
| pH | 7.6 |
| Percentage of saturation (%) | 207 |
| Moisture level (%) | 35.4 |
| Electrical conductivity (decisiemens/m) | 6.30 |
| Organic matter (%) | 48.7 |
| Organic carbon (%) | 37.5 |
| Ash (%) | 70.4 |
| Nitrogen (% or ppm) | 1.3 OR 13,000 |
| Ammonium (%) | 2642 |
| Nitrate (%) | 196 |
| C:N ratio | 31.1 |
| Cationic exchange capacity (meq/100 g) | 47.6 |

-continued

| | |
|---|---|
| Phosphorus (%) | 0.62 |
| Potassium (%) | 1.36 |
| Iron (ppm) | 943 |
| Manganese (ppm) | 306 |
| Zinc (ppm) | 185 |
| Copper (ppm) | 42 |

Then 21 days after the start of the method: T=21 days

| | |
|---|---|
| Colour | Brown-yellow |
| Odour | Unpleasant odour |
| Density (kg/m$^3$) | 740 |
| pH | 7.6 |
| Percentage of saturation (%) | 196 |
| Moisture level (%) | 25 |
| Electrical conductivity (decisiemens/m) | 5.29 |
| Organic matter (%) | 28 |
| Organic carbon (%) | 16.3 |
| Ash (%) | 72 |
| Nitrogen (% or ppm) | 1.17 or 11,700 |
| Ammonium (%) | 2655 |
| Nitrate (%) | 159 |
| C:N ratio | 14.1 |
| Cationic exchange capacity (meq/100 g) | 65.5 |
| Phosphorus (%) | 0.58 |
| Potassium (%) | 1.07 |
| Iron (ppm) | 914 |
| Manganese (ppm) | 246 |
| Zinc (ppm) | 157 |
| Copper (ppm) | 37 |

Then 42 days after the start of the method: T=42 days

| | |
|---|---|
| Colour | Dark brown |
| Odour | No odour |
| Density (kg/m$^3$) | 635 |
| pH | 7.33 |
| Percentage of saturation (%) | 234 |
| Moisture level (%) | 23.3 |
| Electrical conductivity (decisiemens/m) | 4.71 |
| Organic matter (%) | 25.8 |
| Organic carbon (%) | 19.5 |
| Ash (%) | 65.8 |
| Nitrogen (% or ppm) | 1.35 OR 13,500 |
| Ammonium (%) | 2241 |
| Nitrate (%) | 104.2 |
| C:N ratio | 14.1 |
| Cationic exchange capacity (meq/100 g) | 88.2 |
| Phosphorus (%) | 0.62 |
| Potassium (%) | 1.12 |
| Iron (ppm) | 1037 |
| Manganese (ppm) | 319 |
| Zinc (ppm) | 160 |
| Copper (ppm) | 60 |

The invention claimed is:

1. A composition for fertilizing agricultural land, wherein the composition comprises:
   animal excrement;
   plant waste;
   bentonite in a quantity greater than 10% by weight of the final composition;
   macronutrients;
   micronutrients;
   agricultural sulphur;
   algae; and
   efficient microorganisms.

2. A composition according to claim 1, in which the bentonite represents 10% to 25% of the weight of the final composition.

3. A composition according to claim 1, in which the animal excrement is chicken excrement.

4. A composition according to claim 1, in which the carbon:nitrogen ratio is 14:1 after 21 days of fermentation.

5. A composition according to claim 1, in which the micronutrients are selected from the group consisting of ferrous sulphate, zinc, manganese and copper sulphate.

6. A composition according to claim 1, in which the macronutrients are selected from the group consisting of superphosphate, ammonium nitrate, potassium sulphate and magnesium sulphate.

7. A composition according to claim 1, in which the cationic exchange capacity of the composition is increased by 80% to 120% after 42 days of fermentation.

8. A composition according to claim 1, in which the cationic exchange capacity is increased by 100% after 42 days of fermentation.

9. A composition according to claim 1, in which the animal excrement represents 10% to 25% by weight of the final composition.

10. A composition according to claim 1, in which the plant waste comprises compost and/or non-fermented plant waste.

11. A composition according claim 10, in which non-fermented plant waste represents 30% to 40%.

12. A composition according to claim 11, in which the compost represents 10% to 20%.

13. A composition according to claim 1, in which the algae a quantity of 2 to 3 liters per tonne of final composition.

14. A composition according to claim 1, in which the efficient microorganisms comprise in a quantity of 2 to 3 liters per tonne of the final composition.

15. A composition according to claim 1, comprising, for one tonne of final composition:

| | |
|---|---|
| animal excrement | 100 kg |
| plant waste | 350 kg |
| compost | 120 kg |
| bentonite | 120 kg |
| superphosphate | 40 kg |
| ammonium nitrate | 60 kg |
| feldspar | 30 kg |
| zinc | 5 kg |
| manganese | 5 kg |
| copper sulphate | 3 kg |
| agricultural sulphur | 30 kg |
| algae | 2.5 liters |
| efficient microorganisms | 2.5 liters |
| compost starter | 2.5 liters |
| water | QSP 1000 kg. |

16. A method for manufacturing a composition for fertilizing agricultural land according to claim 1, wherein the method comprises the following steps:
   chopping the animal excrement and plant waste into small pieces;
   forming, in a light-tight and airtight container, successive layers of animal excrement and plant waste, and then bentonite mixed with the macronutrients and micronutrients;
   moistening each layer with water mixed with the algae and efficient microorganisms so as to obtain a moisture level of 20% to 50%; and
   mixing twice a week, for at least three weeks, for the fermentation, checking the moisture level and temperature and spraying water as necessary to maintain a moisture level of 20% to 25% and a temperature of 40° to 55° to obtain the composition according to claim 1.

17. A method according to claim 16, in which half the quantity of efficient microorganisms is mixed with water in order to moisten each layer and the other half of the quantity of efficient microorganisms is mixed with the water for irrigating the land fertilized during the first spraying.

18. A method of use of a composition for fertilizing agricultural land by mixing 5 tonnes of the composition according to claim 1 per feddan of land.

19. The method of use according to claim 18, in which the earth is turned over to a depth of 30 cm.

20. A method for fertilizing agricultural land, wherein the method comprises the following steps:
   dispersing 5 to 7 tonnes of composition according to claim 1 over 1 feddan of land;
   turning over the earth; and
   irrigating the fertilized land with water and 1 to 1.5 liters of efficient microorganisms.

* * * * *